United States Patent

Nelson

[15] 3,665,204
[45] May 23, 1972

[54] ACOUSTO-OPTIC TUNING OF OPTICAL SECOND HARMONIC GENERATORS AND OTHER PARAMETRIC DEVICES

[72] Inventor: Donald Frederick Nelson, Summit, N.J.
[73] Assignee: Bell Telephone Laboratories, Incorporated, Murray Hill, Berkeley Heights, N.J.
[22] Filed: Nov. 16, 1970
[21] Appl. No.: 89,622

[52] U.S. Cl..............................307/88.3, 330/4.5, 350/161
[51] Int. Cl. ..................................................H03f 7/00
[58] Field of Search.....................307/88.3; 321/69; 330/4.5; 350/161

[56] References Cited

UNITED STATES PATENTS 3,469,107    9/1969    Townes et al..........................307/88.3

OTHER PUBLICATIONS

Wallace et al., IEEE Journal of Quantrum Electronics May 1968, p. 354-355.

*Primary Examiner*—Roy Lake
*Assistant Examiner*—Darwin R. Hostetter
*Attorney*—R. J. Guenther and Arthur J. Torsiglieri

[57] ABSTRACT

An input optical wave and an input acoustic wave are incident upon an optically nonlinear crystal to form a phase-matched intermediate acousto-optical wave propagating in the crystal. By appropriately orienting the crystal axes relative to the propagation and polarization directions of the various waves propagating therein, an output second harmonic optical wave can be generated which is also phase-matched, and which can be modulated in intensity according to the input acoustic wave intensity or frequency. This phase-matching of both the intermediate and the output waves increases the overall efficiency of modulation.

10 Claims, 3 Drawing Figures

PATENTED MAY 23 1972 3,665,204

INVENTOR
D. F. NELSON
BY
D Caplan
ATTORNEY

ACOUSTO-OPTIC TUNING OF OPTICAL SECOND HARMONIC GENERATORS AND OTHER PARAMETRIC DEVICES

FIELD OF THE INVENTION

This invention relates to the field of optical modulators, and more particularly to optical second harmonic generators which are acoustically modulated.

BACKGROUND OF THE INVENTION

In one form of optical communication systems, an optical wave transmits information from one place to another by reason of a pattern of optical amplitude modulation (hence, amplitude modulation) which is impressed upon the optical wave. Typically, the source of the wave is a laser of fixed optical frequency. In order to increase the information transmission capacity, one pattern of information is impressed upon the fundamental optical wave supplied by the laser source, and another pattern of information is impressed upon a second harmonic optical wave supplied by an optical second harmonic generator in response to the laser source. In addition, optical second harmonic generators are useful where the optical wave supplied by the laser source is poorly transmitted by the transmission medium, whereas the optical second harmonic is transmitted more efficiently by the medium.

Nonlinear optical crystalline materials constitute one class of optical second harmonic generators. In the prior art, these materials have been used in conjunction with ultrasonic acoustic signal waves, in order to produce a second harmonic optical wave whose intensity is modulated in accordance with the acoustic signal. However, the efficiency of modulation has been severely limited, typically to about $10^{-8}$ in the case of 10.6 micron fundamental laser beams propagating through gallium arsenide. G. D. Boyd, F. R. Nash, and D. F. Nelson, *Physical Review Letters*, Vol. 24, pages 1298-1301 (June 1970). This is true, even though, for example, when all waves propagate in the same direction ("collinear interaction"), the output second harmonic wave is "phase-matched" with respect to the input fundamental optical and acoustic waves. By "phase-matched" is meant:

$$2k_1 + k_A = k_2, \qquad 1.$$

where $k_1$, $k_A$, and $k_2$ are the propagation constants in the acousto-optic material of the input fundamental optical wave, the input acoustic wave, and the output second harmonic optical wave, respectively. It should be understood that the frequency of the output second harmonic optical wave may be slightly different from $2f_1$ (where $f_1$ is equal to the fundamental optical frequency), by an amount of the order of the acoustic signal wave frequency $f_A$. For most practical purposes, this difference is negligible and will therefore be neglected.

It is an object of this invention to provide acoustically modulated ("tuned") optical harmonic wave generators, and other acoustically tuned optical parametric devices, with improved efficiency.

SUMMARY OF THE INVENTION

In an embodiment of this invention, an optically nonlinear doubly refracting crystal, is an acoustically modulated ("tuned") second harmonic wave generator, is oriented with respect to the input optical and acoustic wave beams such that there is generated therein an intermediate optical wave of propagation constant $k_i$ which is also phase-matched; that is:

$$k_i = k_A + k_1; \qquad 2.$$

and either $$k_2 = k_i + k'_1, \qquad 3A.$$

or else $$k_2 = k_i + k_i. \qquad 3B.$$

Here, $k'_1$ represents the propagation constant of a component of the fundamental input wave which in general can have a different polarization from the other component thereof having the propagation constant $k_1$ in the crystal. In the collinear case, Eq. (3A) represents a case of "double" phase-matching, and Eq. (3B) represents a case of "triple" phase-matching. In the case of "double" phase-matching, the efficiency of second harmonic generation increases as the fourth power of the interaction length of the waves in the crystal; whereas in the case of "triple" phase-matching, this efficiency increases as the sixth power of the interaction length. The coupling interaction involved between the waves represented by $k_A$ and $k_1$ in Eq. (2) is provided by the relevant component of the photoelastic tensor of the crystal; whereas the coupling involved in Eqs. (3A) or (3B) is provided by the relevant component of the nonlinear optical mixing tensor.

In the general collinear propagation case, the intermediate optical wave $k_i$ will nevertheless have a different polarization from that of the input optical wave $k_1$; whereas the output second harmonic optical wave can generally have the polarization of either the input fundamental optical wave $k_1$ or the intermediate optical wave. In any event, regardless of polarizations, according to this invention, both the intermediate wave and the output wave are phase-matched, respectively, in accordance with Eqs. (2) and either (3A) or (3B). In order to satisfy these conditions, the orientation of the nonlinear crystal must be selected accordingly, depending upon the dispersion and birefringence of the crystal and the polarization and propagation directions of the various waves, as will become clearer from the further discussions below.

Although this invention has been described in detail with respect to the collinear case, it should be understood that the propagation directions of all the optical and acoustic wave beams need not be collinear in the practice of this invention. While the collinear type of interaction has the advantage that the interaction length is independent of and not limited by the width of the beams, it should be understood that a sufficiently large interaction volume can be obtained even when the beams are not collinear, provided only that the input and intermediate optical beams propagate in the nonlinear crystal at sufficiently small angles to one another. This is true because although suitably intense optical beams are ordinarily limited to a relatively small beam cross section (of the order of 1 $mm^2$), the cross section of an acoustic wave can be made to be quite large (of the order of 1 $cm^2$). In such noncollinear interactions, according to the invention, Eqs. (2), (3A), and (3B) are to be understood as vector equations involving the various propagation constants (vectors). In the quantum mechanical aspect, these equations represent momentum conservation. Moreover, these equations also represent conditions for more general nonlinear parametric devices, that is, devices for which the Manley-Rowe relations are satisfied ("General Energy Relations in Nonlinear Reactance," *Proc. IRE* 47, pages 2115-6, Dec. 1959). Such devices, in general, are not necessarily restricted to second harmonic generators, but also include other types of nonlinear acousto-optical devices, such as tunable optical mixers, converters, and other parametric devices. Such devices represent more general cases than optical second harmonic generators, the latter (in the collinear case) including the special case of optical mixers in which a single input beam of fundamental optical wave energy mixes with itself.

In a specific embodiment of this invention, an input fundamental optical beam is supplied by a neodymium-doped yttrium aluminum garnet laser (YAG:Nd$^{3+}$), having a wavelength of 1.06 micron. This beam is incident upon an optically nonlinear uniaxial crystal of lithium niobate. The crystal is oriented such that the optical beam propagates along the $y$ crystallographic axis therein, and so that the beam provides a significant extraordinary ray component therein (i.e., optical electric field along the $z$ crystallographic axis). An input signal acoustic shear wave is generated in the crystal by means of an acoustic transducer, such that the shear wave produces a particle displacement along the $x$ crystallographic axis in the crystal while propagating along the $y$ axis. The frequency of the acoustic wave is selected to satisfy Eqs. (2) and (3B). Since all refractive indices, and hence the magnitude of the various propagation constants, vary with temperature, the temperature of the crystal advantageously is controllably maintained at a fixed temperature, ordinarily somewhat above room temperature. Thereby, Eqs. (2) and (3B) are more nearly perfectly satisfied. Utilization means collects the output second harmonic (0.53 micron wavelength) optical wave beam exiting from the crystal, while the intensity (amplitude) of this existing beam can be modulated in accordance with the acoustic wave intensity or frequency (or both) generated by the transducer.

In order to determine the frequency $f_A$ of the input signal acoustic wave which will enable Eqs. (2) and (3B) to be satisfied in this specific embodiment, it is helpful to write these equations in terms of the optical refractive index, $n$, the acoustic shear wave velocity $v_A$, and the wavelength of the fundamental optical wave $\lambda_1$ $$1 n_{ord}(\lambda_1) = \lambda_1 f_A/v_A + n_{extr}(\lambda_1); \qquad 4.$$

while $$2 n_{extr}(\lambda_1/2) = n_{ord}(\lambda_1) + n_{ord}(\lambda_1),$$

that is, $$n_{extr}(\lambda_1/2) = n_{ord}(\lambda_1), \qquad 5.$$

where the subscripts "extr" and "ord" refer to extraordinary and ordinary wave polarizations of the uniaxial crystal, and the parenthesis $(\lambda_1)$ and $(\lambda_1/2)$ following the subscripts indicate that the refractive indices correspond to the fundamental wave beam of vacuum wavelength $\lambda_1$ and the second harmonic $(\lambda_1/2)$, respectively. Thereby, Eq. (5) determines the desired orientation(s) of the crystal with respect to the propagation and polarization directions of the input optical wave, whereas Eq. (4) determines the input signal acoustic frequency, for the case of uniaxial crystals.

BRIEF DESCRIPTION OF THE DRAWING

This invention together with its features, advantages, and objects may be better understood from the following detailed description when read in conjunction with the drawing in which.

DETAILED DESCRIPTION

Figure 1:
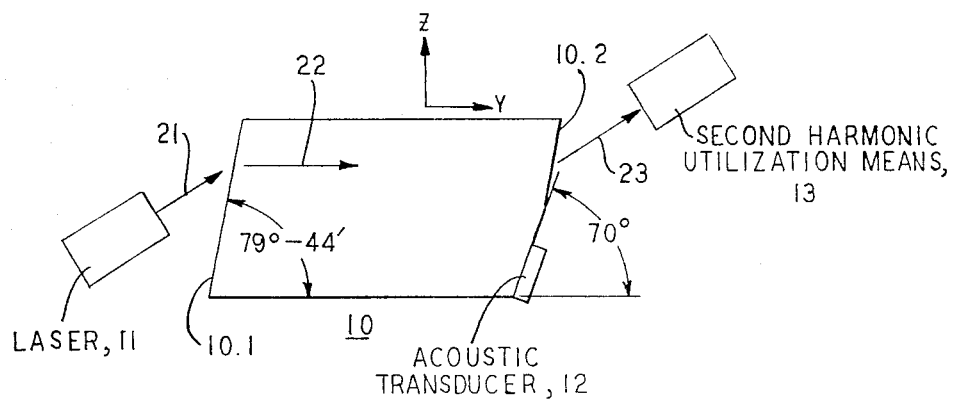
FIG. 1 is a block diagram of a system for optical second harmonic generation, according to a specific embodiment of this invention.

As indicated in FIG. 1, a monocrystalline optically non-linear birefringent body 10 of lithium niobate, typically 1 cm cubed, is located in the path of a fundamental wave beam of optical radiation 21 supplied by a YAG:Nd$^{3+}$ laser 11 ($\lambda_1 = 1.06$ micron). This optical beam 21 is incident upon a surface 10.1 of the body 10 maintained at a temperature of about 160° C, such that the beam propagates in a direction 22 in the lithium niobate body 10 toward an opposed surface 10.2 parallel to the surface 10.1. Advantageously, the crystalline body 10 is cut and oriented such that the direction 22 is parallel to the $y$ crystallographic axis of the lithium niobate body 10, in accordance with well-known optical refraction principles. The beam 21 advantageously contains a significant component of optical energy having an optical electric vector polarization in the crystallographic $z$ direction in the plane of the drawing, so that a significant "extraordinary" optical wave (i.e., polarized in the $z$ direction) is propagated from the laser 11 along the direction 22 in the body 10. An acoustic transducer 12 bonded to a crystal surface 10.3 launches an acoustic shear wave of controllable amplitude in the body 10. Alternatively, the frequency and/or the amplitude of the shear wave is controllable by the transducer 12. This transducer 12 advantageously supplies a shear wave having a significant component of displacement vector polarization in the $x$ direction perpendicular to the plane of the drawing, after reflection by the surface 10.1, in accordance with well-known acoustic principles. The frequency of this shear wave is in the range of about 290 to 310 MHz, preferably about 302 MHz. Typically, the transducer 12 is driven by an electrical driving network (not shown) at this frequency, in order to provide this shear wave in the body 10. Thereby, Eqs. (2) and (3B) are satisfied, as discussed more fully below. This shear wave is reflected by the surface 10.1 of the body 10 so that, after reflection, a reflected shear wave propagates along the $y$ direction in the body 10. In order to accomplish this, for example, the surfaces 10.1 and 10.2 are cut at an angle of 79° 44' with respect to the $y$ direction 22, and the surface 10.3 is cut at an angle of 70° thereto. It is important to adjust the positions of the laser 11 and the transducer 12 so that the laser beam 21 and this shear wave are superimposed upon each other as they propagate along the direction 22 (parallel to the $y$ crystallographic axis) in the lithium niobate body 10. In accordance with the principles of this invention, these beams interact with the body 10 so that an output second harmonic optical beam 23 ($\lambda_2 = 0.53$ micron) exits through the surface 10.2 thereof. This output beam 23 is polarized in the $z$ direction and is collected by the means 13 for utilizing this second harmonic optical output.

Figure 2:
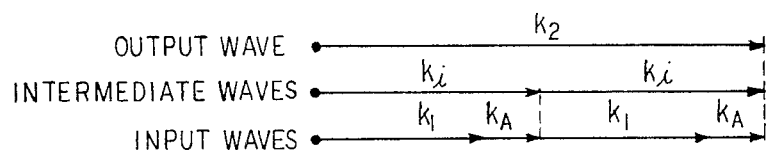
FIG. 2 is a vector diagram useful in explaining the operation of the system shown in FIG. 1, in the case of "triple" phase-matching.

In order to explain the operation of the system shown in FIG. 1, it is helpful to refer to FIG. 2, a vector diagram of the various relevant propagation constants. The input beam 21 has a propagation constant $k_1$ in the body 10. The acoustic shear wave, after reflection by the surface 10.1, has a propagation constant $k_A$. Both $k_1$ and $k_A$ are in the $y$ direction, i.e., collinear. By reason of acousto-optic interaction, an intermediate optic wave $k_i$ is generated in the crystal body 10, where $k_i = k_1 + k_A$. The intermediate wave $k_i$ is polarized in the $x$ crystallographic direction, i.e., the intermediate wave $k_i$ is an "ordinary" wave. The output second harmonic optical wave 23 is polarized in the $z$ direction (i.e., "extraordinary"). Solving Eq. (4) above for $f_A$, $$f_A = (v_A/\lambda_1)\{n_{ord}(\lambda_1) - n_{extr}(\lambda_1)\} \qquad 6.$$

For lithium niobate, $v_A = 4.0 \times 10^3$ meter/sec; and at $\lambda_1 = 1.06$ micron, $n_{ord} = 2.2340$ and $n_{extr} = 2.1,540$. Using these values, $f_A$ is found from Eq. (6) to be approximately equal to 302 MHz. Moreover, for an (harmonic) optical wavelength of 0.53 micron in lithium niobate at a temperature of about 160° C, the value of $n_{extr}$ is equal to the value of $n_{ord}$ for a (fundamental) wavelength of 1.06 micron, to wit, 2.2,340; that is, $n_{extr}$ (0.53 micron) = $n_{ord}$ (1.06 micron) = 2.2,340. Thus, the Eqs. (4) and (5) above are satisfied in this embodiment, which in turn implies that Eqs. (2) and (3B) are likewise satisfied, the former pair of equations having been derived from the latter pair of equations. This equality is illustrated in the vector diagram of FIG. 2, in which the propagation constants satisfy Eqs. (2) and (3B) above, that is, "triple" phase-matching in the collinear case.

Figure 3:
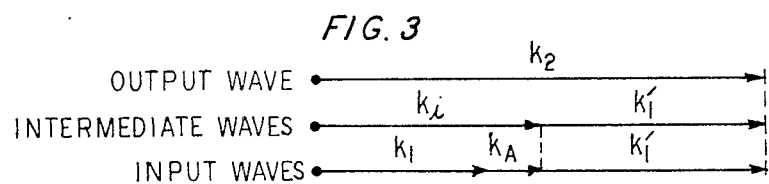
FIG. 3 is a vector diagram useful in explaining the operation of the system shown in FIG. 1, in the case of "double" phase-matching.

The system shown in FIG. 1 can also be adjusted so that the propagation constants satisfy Eqs. (2) and (3A), that is, "double" phase-matching in the collinear case, in accordance with another specific embodiment of this invention. In this alternative, the input wave 21 advantageously provides significant components of optical energy polarized both along the $z$ direction ("extraordinary wave") and the $x$ direction ("ordinary wave") in the lithiumniobate body 10; the vacuum wavelength of this input wave is advantageously again approximately $\lambda_1 = 1.06$ micron. The transducer 12 advantageously provides an acoustic shear wave, propagating in the body 10 in the direction 22 with a displacement vector polarized in the $x$ direction, having a frequency again in the range of about 290 to 310 MHz, preferably about 302 MHz. The input wave 21 and this acoustic shear wave will then interact in the body 10 in accordance with Eqs. (2) and (3A), to produce an output second harmonic wave 23 which exits through the surface 10.2 for utilization. However, for this case, the vector diagram of the propagation constants is indicated in FIG. 3.

In order to understand the operation of this embodiment of "double" phase-matching in this collinear case, it should first be remembered that the input optical wave 21 has an "extraordinary" polarization with propagation constant $k_1$ in the body 10 together with an "ordinary" polarization with propagation constant $k'_1$; whereas the intermediate optical wave $k_i$ has an "ordinary" polarization therein, and the output second harmonic optical wave 23 has an "extraordinary" polarization. Therefore, rewriting Eqs. (2) and (3A) for this collinear case of "double" phase-matching, it is found again that:

$$n_{extr}(\lambda_1/2) = n_{ord}(\lambda_1) \quad\quad 5. \text{ and}$$
$$f_A = (v_A/\lambda_1)\{n_{ord}(\lambda_1) - n_{extr}(\lambda_1)\} \quad\quad 6.$$

Thus, Eq. (5) again determines the required orientation of the crystal body 10, whereas Eq. (6) determines the required frequency of the acoustic wave supplied by the transducer 12.

Although this invention has been described in detail in terms of acoustically tunable optical second harmonic generators only, as mentioned earlier, the principles of this invention can be generalized and applied to more general nonlinear parametric devices. Thus, in this invention's broader aspects, an optically nonlinear crystal is used as the active element in acousto-optic parametric devices with distributed coupling, in which the crystal is oriented such that at least one intermediate optical wave is generated therein satisfying (vector) Eq. (2) with respect to one of the beams in an input of optical wave energy, and satisfying (vector) Eq. (3A) or (3B) with respect to the output optical wave. For example, parametric frequency converter can be provided in which two input optical waves respectively having propagation constants, $k_1$ and $k'_1$, and frequencies $f_1$ and $f'_1$, are converted in the nonlinear crystal into an output optical wave $k_2$. This output is tuned (modulated) by means of an acoustic wave $k_A$, while the crystal is oriented such that:

$$k_i = k_1 + k_A; \quad\quad 7.$$
$$k'_i = k'_1 + k_A; \quad\quad 8.$$

and $$k_2 = k_i + k''_i. \quad\quad 9B.$$

In Eqs. (7), (8), and (9B), $k_i$ and $k'_i$ represent intermediate optical waves in the crystal, the crystal being oriented to satisfy these equations under the conditions that $f_2 = f_1 + f'_1$ (approximately) while $f_i = f_1$ and $f'_i = f'_1$ (approximately). Eqs. (7), (8), and (9B) are generalizations of Eqs. (2) and (3B), that is, "triple" phase-matching. By analogy to Eqs. (2) and (3A), the crystal can alternatively be oriented ("double" phase-matching) such that while an intermediate wave still satisfies Eq. (7) now instead of Eq. (9B), $k_2$ satisfies:

$$k_2 = k_i + k'_1. \quad\quad 9A.$$

The nonlinear parametric devices encompassed by Eqs. (7), (8), and (9A) or (9B) can be further generalized in accordance with this invention, to include noncollinear cases and to encompass the case of two different input signal acoustic waves; that is, in addition to the input optical waves $k_1$ and $k'_1$ and the input signal acoustic wave $k_A$, another input signal acoustic wave $k'_A$ is present in the nonlinear crystal. In such a case, the optical input $k_1$ and the acoustic input $k_A$ interact by reason of a significant photoelastic tensor component in the nonlinear crystal to produce an intermediate optical wave $k_i$, and the inputs $k'_1$ and $k'_A$ interact, by reason of a significant photoelastic tensor component, to produce an intermediate optical wave $k'_i$. The intermediate optical waves $k_i$ and $k'_i$ then interact to form an output wave $k_2$. For optimum efficiency, in accordance with this invention, the various propagation constants satisfy:

$$\vec{k_1} + \vec{k_A} = \vec{k_i}; \quad\quad 10.$$

$$\vec{k'_1} + \vec{k'_A} = \vec{k'_i}; \quad\quad (11)$$

$$\vec{k_i} + \vec{k'_i} = \vec{k_2}. \quad\quad (12)$$

By appropriately orienting the nonlinear crystal, these equations may be satisfied, and optimum efficiency of wave mixing is thereby achieved. However, improvement over the prior art is obtainable even when only one or two spatial components of these equations (10), (11), and (12) are satisfied. Moreover, by varying the intensity or frequency of one or both of the acoustic waves ($k_A$ and $k'_A$), the amplitude of the output optical wave can be varied (tuned). It should be remarked that in the still broader aspects of this invention, more than two intermediate optical waves can be generated and mutually interacted, so that the output wave in general can have a frequency equal to a linear combination, with integral coefficients, of the frequencies of the input optical and acoustic waves.

It should be remarked that when the acoustic wave $k'_A$ is either absent (or does not interact with $k'_1$), it is clear that (effectively) $k'_A = 0$ (i.e., the optic wave $k'_i$ is simply the same optical wave as the input itself, $k'_1$) and these equations (10), (11), (12) reduce to Eq. (7) and (9A). Moreover, when $k'_A = k_A$ (i.e., both $k_1$ and $k'_1$ interact with the same acoustic wave $k_A$), then these equations reduce to Eqs. (7), (8), and (9B). Likewise, in case of second harmonic generation with a single acoustic wave, then these equations (10), (11), and (12) reduce to Eqs. (2) and (3A) or (3B), depending upon whether $k'_A = 0$ or $k'_A = k_A$ (i.e., whether the input acoustic wave interacts once or twice with the input optical wave before formation of the second harmonic wave $k_2$).

In the more general aspect of this invention, as expressed in Eqs. (10), (11), and (12) above, one or more input optical waves are mixed in an optical nonlinear crystal body with one or more input acoustic waves, it being understood that the same input wave can be involved in one or more interactions to form one or more intermediate optical waves and one or more output optical waves. In all these cases, by rewriting equations (10), (11), and (12) in terms of optical refractive index and wavelength, acoustic frequency and velocity, it is easily shown that, for uniaxial crystals in which ordinary and extraordinary optical polarization are propagated:

$$\pm \lambda_1 f_A/v_A = n_{extr}(\lambda_1) - n_{ord}(\lambda_1); \quad\quad 13.$$
$$\pm \lambda'_1 f'_A/v'_A = n_{extr}(\lambda'_1) - n_{ord}(\lambda'_1); \quad\quad 14.$$
$$(n_1/\lambda_1) + (n'_1/\lambda'_1) = n_2/\lambda_2; \quad\quad 15.$$

in which $\lambda_1$ and $\lambda'_1$ are the wavelengths (in vacuum) of the input optical waves in the nonlinear crystal body. Each of these input waves interacts with acoustic waves $k_A$ and $k'_A$ to form intermediate optical waves $k_i$ and $k'_i$ of wavelength $\lambda_1$ and $\lambda'_1$ (approximately) but of different polarization from the respective input waves. It should be understood that the ± sign in Eqs. (13) and (14) should be selected according to whether the respective input wave is extraordinary or ordinary, respectively. Moreover, $n_1$ and $n'_1$ are the optical refractive indices of the intermediate optical waves; and more particularly $n_1 = n_{extr}(\lambda_1)$ if the intermediate wave of wavelength $\lambda_1$ is polarized "extraordinary," but $n_1 = n_{ord}(\lambda_1)$ if this intermediate wave is polarized "ordinary." Correspondingly, $n'_1 = n_{extr}(\lambda'_1)$ or $n'_1 = n_{ord}(\lambda'_1)$. Eq. (15) determines the desired orientation of the nonlinear crystal body with respect to the input optical wave beams in conjunction with the symmetry of the crystal allowing the appropriate interactions to occur, whereas Eqs. (13) and (14) determine the frequency of the acoustic wave for optimum efficiency in accordance with the invention. It should be understood that in the practice of the invention, one of the acoustic waves $k_A$ (or $k'_A$) may be absent (i.e., $k_A = 0$ or $k'_A = 0$), either actually or effectively (i.e., no interaction with the optical waves) and $\lambda_1$ can be made equal to $\lambda'_1$ (for second harmonic generation).

It should be obvious to the worker of ordinary skill in the art that various modifications can be made in the above-described embodiments without departing from the scope of this invention. For example, instead of locating the transducer 12 at the surface 10.2, this transducer may be located on the surface 10.1. In such a case, advantageously, an aperture in the center of the transducer is provided for the traversal therethrough of the input optical beam 21. In accordance with known diffraction principles, the acoustic wave generated by the transducer will spread out laterally in the $x$ and $z$ directions as the acoustic wave propagates in the $y$ direction in the crystal body 10. Moreover, various other optically nonlinear crystal materials such as $Ba_2NaNb_5A_2$ can be used in combination with various other laser input wavelengths, so long as Eqs. (10), (11), and (12) are satisfied for a selected orientation of the crystal and for selected acoustic frequencies.

Also, the described interactions can be reversed, so that the one output optical wave could be the (one) input optical wave and the two input optical waves could be the (two) output optical waves, the input acoustic wave (or waves) remaining as an input acoustic wave (or waves). Other combinations are also possible where the input acoustic wave(s) become output acoustic wave(s). Thereby, many forms of acoustically tunable parametric converters can be provided in accordance with the invention.

What is claimed is:

1. A device for mixing acoustic and optical wave which comprises:

an optically doubly refracting crystal body having a significant photoelastic tensor component and a significant nonlinear optical interaction tensor component in which body is propagating an input of optical wave energy and an input of acoustic wave energy, the crystal being oriented with respect to the propagation direction and polarization direction of the input acoustic wave, and the frequency of the acoustic wave being such that:

$$\vec{k}_A + \vec{k}_1 = \vec{k}_i,$$
$$\vec{k}'_A + \vec{k}'_1 = \vec{k}'_i,$$

and $$\vec{k}_i + \vec{k}'_i = \vec{k}_2,$$

where $\vec{k}_1$ is the propagation vector in the body of one of the input beams of optical radiation, $\vec{k}'_1$ is the propagation vector in the body of another or the same input optical beam in the input of optical energy, and $\vec{k}_A$ is the propagation vector in the body of one of the input beams of acoustic wave energy, $\vec{k}'_A$ is the propagation vector in the body of another or the same of the input beams of acoustic wave energy, $\vec{k}_i$ is the propagation vector of an intermediate optical wave propagating in the crystal in response to the waves represented by $\vec{k}_A$ and $\vec{k}_1$, $\vec{k}'_i$ is the propagation vector of an intermediate optical wave in the crystal in response to $\vec{k}'_A$ and $\vec{k}'_1$ (or in response to $\vec{k}_1$), and where $\vec{k}_2$ is the propagation constant in the body of an output optical wave whose frequency is equal to a linear combination with integral coefficients of the frequencies of the input waves.

2. The device recited in claim 1 in which the crystal is optically uniaxial.

3. The device recited in claim 1 in which the directions of propogation of all interacting waves are collinear.

4. A tunable second harmonic optical generator which comprises:

a. a body in accordance with claim 1 in which $\vec{k}_1 = \vec{k}'_1$; and
b. means for propagating the acoustic wave having the propagation constant $k_A$ in the body with a controllable amplitude or frequency or both.

5. A second harmonic generator according to claim 4 in which the propagation direction of acoustic wave in the body is parallel to the propagation direction of the input optic wave therein.

6. A second harmonic generator according to claim 4 in which the body is lithium niobate oriented such that the input optical wave and input acoustic wave propagate along the $y$ crystallographic axis of the body with a significant component of the optical electric field vector in the $z$ crystallographic direction, the wavelength of the input optical wave is about 1.0 micron, and the frequency of the input acoustic shear wave is of the order of 300 MHz, the displacement vector of the shear wave having a significant component in the $x$ crystallographic direction.

7. A second harmonic generator according to claim 6 in which the wavelength of the input optical wave is about 1.06 micron, and the frequency of the input acoustic wave is in the range of about 290 to 310 MHz.

8. A second harmonic generator according to claim 7 in which the frequency of the acoustic wave is about 302 MHz.

9. A second harmonic generator according to claim 6 in which the input optical electric field vector has a significant optical electric field component in both the $z$ and $x$ crystallographic directions.

10. A second harmonic generator according to claim 9 in which the frequency of the acoustic wave is in the range of about 290 to 310 MHz.

* * * * *